United States Patent
Tsuda

[19]

[11] Patent Number: 6,005,615
[45] Date of Patent: Dec. 21, 1999

[54] CORRECTING AN OPTICAL BLACK LEVEL BY FEEDING FORWARD A CALCULATED CORRECTION AMOUNT

[75] Inventor: Yuji Tsuda, Kawasaki, Japan

[73] Assignee: Canon Kabushiki Kaisha, Tokyo, Japan

[21] Appl. No.: 08/620,327

[22] Filed: Mar. 22, 1996

[30] Foreign Application Priority Data

Mar. 27, 1995 [JP] Japan ..................................... 7-067772

[51] Int. Cl.⁶ .............................. H04N 5/228; H04N 9/64
[52] U.S. Cl. ........................... 348/243; 348/222; 348/250
[58] Field of Search ..................................... 348/241, 243, 348/222, 250, 678, 683; 382/270, 274, 275; H04N 5/18, 5/228, 9/64

[56] References Cited

U.S. PATENT DOCUMENTS 3,737,571  6/1973  Gaebele et al. .......................... 348/243
4,559,559 12/1985  Hashimoto et al. ..................... 348/243
4,972,266 11/1990  Tani .......................................... 348/243
5,278,658  1/1994  Takase .
5,512,947  4/1996  Sawachi et al. ......................... 348/243

FOREIGN PATENT DOCUMENTS 06133186  5/1994  Japan ................................. H04N 5/18

*Primary Examiner*—Tuan Ho
*Assistant Examiner*—Ngoc-Yen Vu
*Attorney, Agent, or Firm*—Fitzpatrick, Cella, Harper & Scinto

[57] ABSTRACT

An image processing apparatus constructed in a manner such that an image signal is inputted, the inputted image signal is clamped to a predetermined reference voltage in a clamp circuit, an optical black level of the clamped image signal is detected by a detection circuit, the detected optical black level and a predetermined black level are compared and a correction amount is calculated in an operation circuit, and the optical black level is corrected by operating the correction amount obtained by the operation circuit for the clamped image signal in a correction circuit.

18 Claims, 3 Drawing Sheets

BEFORE INCREASE OF AGC GAIN (1) DC VOLTAGE IN BLACK (BLK) PERIOD
(2) OB LEVEL
(3) DC OFFSET AMOUNT

AFTER INCREASE OF AGC GAIN

CORRECTING AN OPTICAL BLACK LEVEL BY FEEDING FORWARD A CALCULATED CORRECTION AMOUNT

BACKGROUND OF THE INVENTION

1. Field of the Invention

The present invention relates to an image processing apparatus of a VTR of a camera integrated type or the like.

2. Related Background Art

FIG. 1 is a block diagram showing a construction of a conventional image pickup apparatus.

In the circuit construction shown in FIG. 1, reference numeral 1 denotes an image pickup element such as a CCD or the like for photoelectrically converting an image and outputting an image signal; 2 a circuit constructed by a double correlation sampling circuit for reducing noises included in the image signal outputted from the image pickup element 1 and an AGC circuit for adjusting a gain of the image signal (hereinbelow, the circuit 2 is referred to as an AGC circuit); 4 an A/D converter for converting the image signal outputted from a clamp circuit 3, which will be explained hereinlater, to a digital signal of eight or ten bits; 5 a signal processing circuit for performing a digital signal process to a digital image signal outputted from the A/D converter 4; 7 a clamp voltage generation circuit for integrating the image signal corresponding to an optical black portion from the image pickup element 1, namely, an optical black level (hereinbelow, referred to as an OB level) of a Y signal every horizontal line and for generating a clamp control voltage on the basis of the integration value; 6 a clamp pulse generation circuit for generating a timing pulse when clamping by a voltage generated by the clamp voltage generation circuit 7; and 3 the clamp circuit for setting a level of the image signal outputted from the AGC circuit 2 to the voltage generated by the clamp voltage generation circuit 7 by the timing pulse generated from the clamp pulse generation circuit 6 (hereinbelow, such a level setting is referred to as clamping).

The specific operation of the conventional image pickup apparatus with such a construction will now be described by also referring to a timing chart of the clamp pulse in FIG. 2.

In the circuit construction of FIG. 1, the image signal outputted from the image pickup element 1 is inputted to the AGC circuit 2 and is amplified to a predetermined signal level. The image signal outputted from the AGC circuit 2 is coupled by a capacitor 13 in an AC manner and is inputted to the clamp circuit 3. The image signal inputted to the clamp circuit 3 is clamped to the clamp voltage generated and outputted by the clamp voltage generation circuit 7 by the clamp pulse (refer to FIG. 2) outputted from the clamp pulse generation circuit 6 in the clamp circuit 3.

The clamped image signal is inputted to the A/D converter 4 and is converted to the digital signal. After that, signal is subjected to a digital signal process by the signal processing circuit 5. The processed signal is recorded by a D-VTR 14 and is also displayed on a monitor 15. The digital signal converted by the A/D converter 4 is also inputted to the clamp voltage generation circuit 7. In the clamp voltage generation circuit 7, the optical black level (OB level) of the Y signal corresponding to an optical black (hereinbelow, referred to as an OB) of the image pickup element 1 is integrated every horizontal line or at preset intervals, thereby generating a clamp voltage such that the integration value is equal to a predetermined value.

The clamp voltage which is generated from the clamp voltage generation circuit 7 constructs a closed loop among the clamp circuit 3, A/D converter 4, and clamp voltage generation circuit 7, so that a feedback is performed so as to hold the OB level of the signal which is inputted to the signal processing circuit 5 to be constant.

The conventional image pickup apparatus performs the clamping of the image signal by the above-mentioned construction.

In the conventional image pickup apparatus, however, as shown in explanatory diagrams with respect to a DC offset amount between the DC voltage and the OB level in a black period shown in FIGS. 3A and 3B, a DC offset exists between the DC voltage (1) in the black period and the OB level (2) of the image signal. Since the DC offset amount (3) [(3)=(2)−(1)] changes depending on the gain of the AGC, a tracing operation of the feedback is disturbed by a time constant when obtaining the OB integration value, so that the clamping operation is not correctly executed.

There is, consequently, a problem such that the OB level of the image signal fluctuates when the signal process is performed, so that the stable image signal cannot be obtained.

SUMMARY OF THE INVENTION

It is an object of the invention to provide an image processing apparatus which can obtain an image signal whose signal level is stable.

Another object of the invention is to provide an image pickup apparatus which can obtain an image signal having a stable optical black level.

To accomplish the above objects, according to an embodiment of the invention, there is provided an image processing apparatus comprising: input means for inputting an image signal; clamp means for clamping the image signal to a predetermined reference voltage; detecting means for detecting an optical black level of the clamped image signal; operating means for comparing the optical black level detected by the detecting means and a predetermined black level, thereby calculating a correction amount; and correcting means for correcting the optical black level by operating the correction amount obtained by the operating means for the clamped image signal.

According to another embodiment of the invention, there is provided an image processing apparatus comprising: input means for inputting an image signal; clamp means for clamping the image signal to a predetermined reference voltage; detecting means for detecting an optical black level of the clamped image signal; operating means for comparing the optical black level detected by the detecting means and a predetermined black level, thereby calculating a correction amount; and correcting means for correcting the optical black level by feeding forward the correction amount obtained by the operating means for the clamped image signal.

With the construction as mentioned above, the image processing apparatus which can obtain the image signal whose signal level is stable can be provided.

According to still another embodiment of the invention, there is provided an image pickup apparatus comprising: photoelectric converting means for photoelectrically converting an image pickup light of an object and outputting an image signal; clamp means for clamping the image signal to a predetermined reference voltage; reference voltage generating means for generating the reference voltage; detecting means for detecting an optical black level of the clamped image signal; operating means for comparing the optical black level detected by the detecting means and a predetermined black level, thereby calculating a correction amount; and correcting means for correcting the optical black level by operating the correction amount obtained by the operating means for the clamped image signal.

According to further another embodiment of the invention, there is provided an image pickup apparatus comprising: an image pickup element for converting an image pickup light of an object to an image signal; an AGC circuit for adjusting a gain of the image signal converted by the image pickup element; a clamp circuit for clamping the image signal to a predetermined reference voltage; a reference voltage generation circuit for generating the reference voltage; an A/D conversion circuit for converting the image signal clamped by the clamp circuit to a digital image signal; a detection circuit for detecting an optical black level of the digital image signal; an operation circuit for comparing the optical black level detected by the detection circuit and a predetermined black level, thereby calculating a correction amount; and a correction circuit for correcting the optical black level by operating the correction amount obtained by the operation circuit for the clamped image signal.

With the construction as mentioned above, according to further another object of the invention, the image pickup apparatus which can obtain the image signal having the stable optical black level can be provided.

The above and other objects and features of the present invention will become apparent from the following detailed description and the appended claims with reference to the accompanying drawings.

DETAILED DESCRIPTION OF THE PREFERRED EMBODIMENT

An image pickup apparatus of an embodiment of the invention will now be described with reference to block diagrams of FIGS. 4 and 5.

Figure 1:
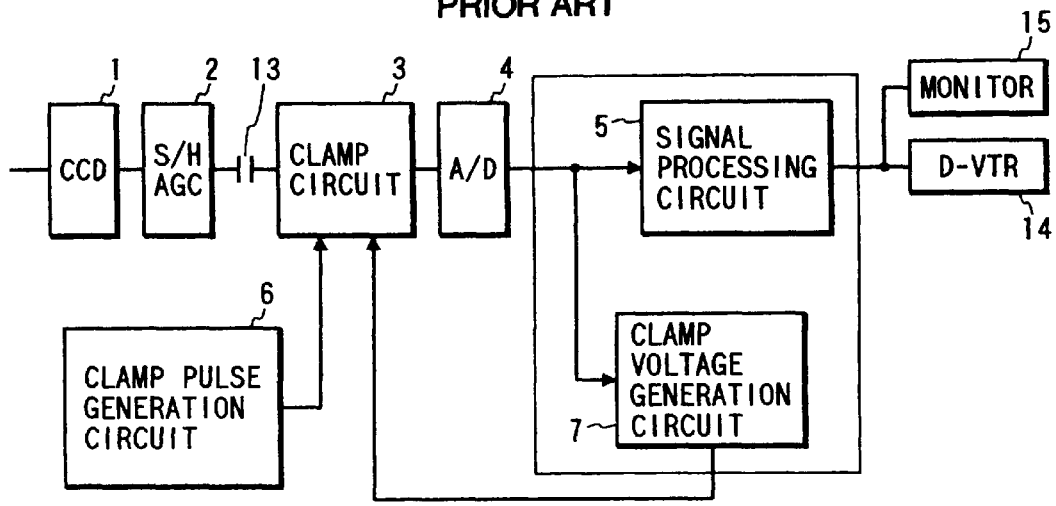
FIG. 1 is a constructional block diagram of a conventional image pickup apparatus.
Figure 4:
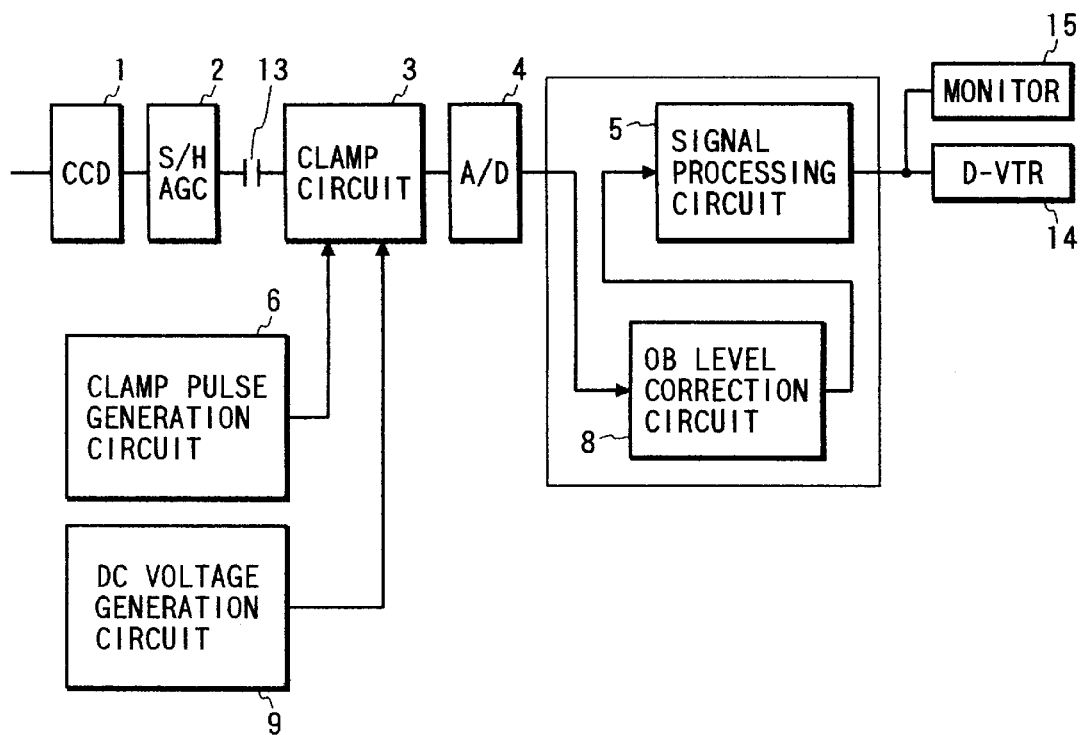
FIG. 4 is a constructional block diagram of an image pickup apparatus of an embodiment.

Since blocks designated by reference numerals 1 to 6 shown in FIG. 4 have the same constructions as those of the blocks 1 to 6 in FIG. 1 described in the related background art, their overlapped descriptions are omitted.

Reference numeral 9 denotes a DC voltage generation circuit for generating a DC voltage as a predetermined reference voltage to clamp a signal inputted to the clamp circuit 3. According to the invention, since a clamp control voltage by an integration value of the OB is not fed back but a clamp voltage is generated by the DC voltage generation circuit 9, an influence such as a level fluctuation or the like due to a change in gain as in the conventional apparatus is hardly exerted. Reference numeral 8 denotes an OB level correction circuit for comparing the OB level of the image signal digital converted by the A/D converter 4 and a predetermined black level, operating an offset amount at which the both levels coincide, and feeding forward the operation result for the OB level of the image signal, thereby performing a correction of an addition or a subtraction.

Figure 5:
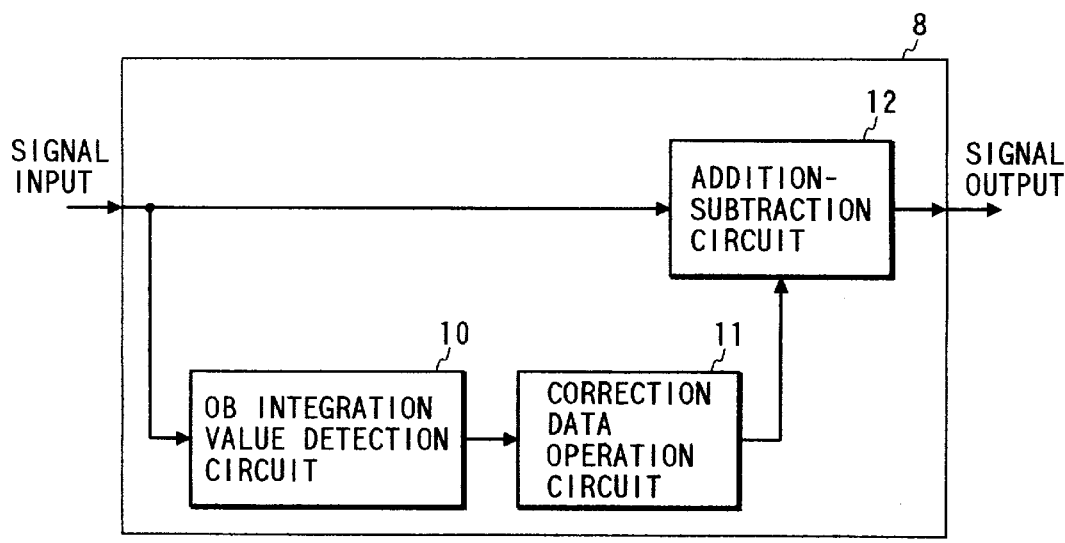
FIG. 5 is a constructional block diagram of an OB level correction circuit provided in the image pickup apparatus of the embodiment.

FIG. 5 is a block diagram showing a construction of the OB level correction circuit 8. Reference numeral 10 indicates an OB integration value detection circuit for integrating the image signal corresponding to an optical black portion of the image pickup element 1 in the image signal, namely, an optical black level (OB level) of a Y signal as a luminance signal every horizontal line or at preset intervals, thereby detecting its integration value; 11 a correction data operation circuit for comparing the OB integration value detected by the OB integration value detection circuit 10 and a predetermined black level, thereby calculating correction data such that the OB integration value and the predetermined black level coincide; and 12 an addition-subtraction circuit for performing an addition or a subtraction of the correction data calculated by the correction data operation circuit 11 for the OB level of the image signal inputted to the OB level correction circuit 8.

The specific operation of the embodiment with the above-mentioned construction will now be described.

Figure 2:
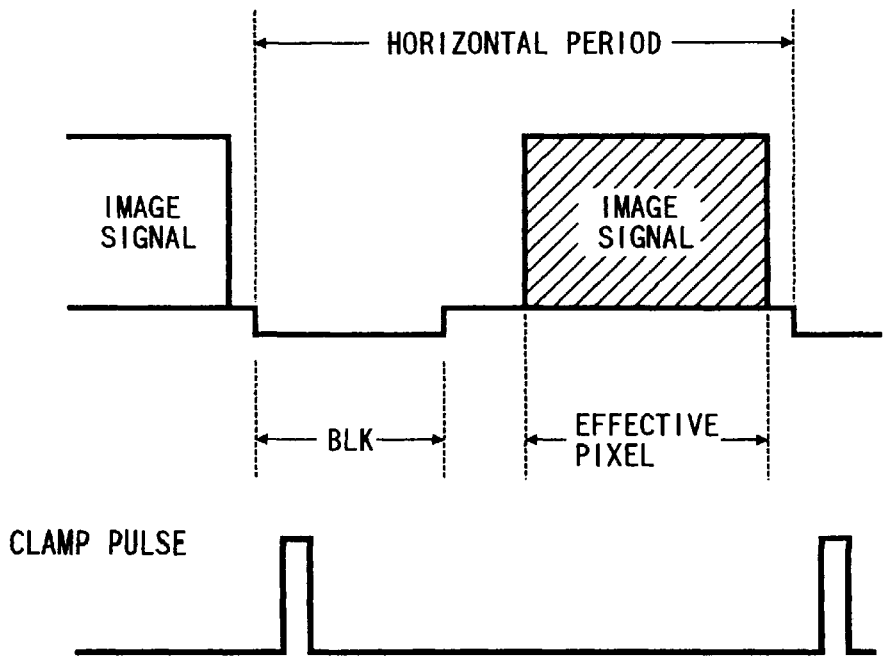
FIG. 2 is a timing chart for explaining a timing for clamping.
Figure 3A:
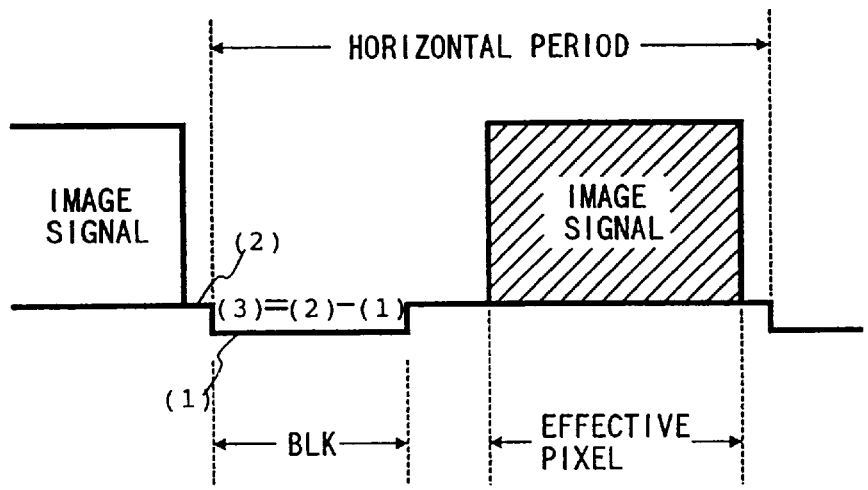
FIGS. 3A and 3B are signal waveform diagrams each for explaining a DC offset amount between a DC voltage and an OB level in a black period.
Figure 3B:
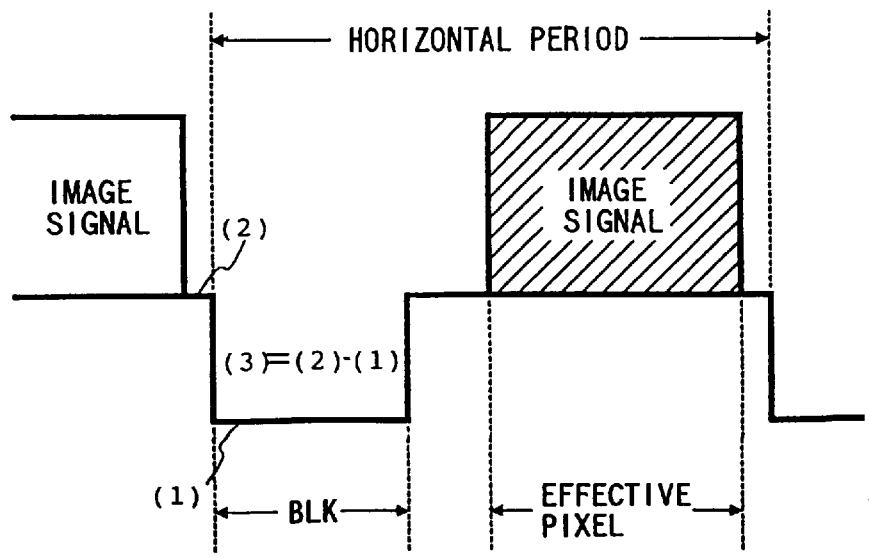

In the circuit construction shown in FIG. 4, the image signal outputted by the image pickup element 1 is inputted to the AGC circuit 2 and is amplified to a predetermined signal level. The image signal outputted from the AGC circuit 2 is coupled by the capacitor 13 in an AC manner and is inputted to the clamp circuit 3. The image signal inputted to the clamp circuit 3 is clamped by a predetermined voltage generated by the DC voltage generation circuit 9 at a timing of the clamp pulse (refer to FIG. 2) outputted by the clamp pulse generation circuit 6 in the clamp circuit 3. The clamped image signal is inputted to the A/D converter 4 and is converted to a digital signal. After that, the digital signal is inputted to the OB level correction circuit 8.

The subsequent processes in the OB level correction circuit 8 will now be described with reference to the block diagram of FIG. 5.

The digital image signal inputted to the OB level correction circuit 8 is supplied to the addition-subtraction circuit 12, and also is inputted to the OB integration value detection circuit 10. The OB integration value detection circuit 10 integrates the OB level of the Y signal corresponding to the optical black portion of the image pickup element 1 in the image signal every horizontal line or at preset intervals, thereby detecting an OB integration value.

The OB integration value detected by the OB integration value detection circuit 10 is compared with the predetermined black level in the correction data operation circuit 11 and correction data to make the OB integration value coincide with the predetermined black level is calculated. In the addition-subtraction circuit 12, the correction data calculated by the correction data operation circuit 11 is added or subtracted to/from the OB level of the image signal inputted to the OB level correction circuit 8, thereby performing a correction so that the OB level of the image signal is equal to the predetermined black level. After that, the corrected image signal is outputted by the OB level correction circuit 8. In FIG. 4, at least the OB level correction circuit 8 and signal processing circuit 5 construct an IC. An output of the signal processing circuit 5 is transmitted to the D-VTR 14 and monitor 15.

As mentioned above, since the integration value of the OB level is not fed back as a clamp voltage but the integration value of the OB level is made coincide with the predetermined black level in the OB level correction circuit 8, a level fluctuation or the like due to the influence by the AGC gain as in the conventional apparatus doesn't occur and the stable and correct image signal can be obtained.

With such a construction, the OB level of the image signal which is inputted to the signal processing circuit 5 is held constant.

As described above, according to the invention, even when the DC offset amount between the reference voltage in the black period, namely, a fixed DC voltage and the OB level of the image signal due to, for example, an increase in gain of the AGC, the OB level of the image signal doesn't fluctuate when the signal process is performed, so that a stable image signal can be outputted. Although the embodiment has been explained with respect to the example in which the image signal from the CCD is processed, it will be obviously understood that the invention can be also applied to an apparatus for processing an image signal inputted by another input means.

Many widely different embodiments of the present invention may be constructed without departing from the spirit and scope of the present invention. It should be understood that the present invention is not limited to the specific embodiments described in the specification, except as defined in the appended claims.

What is claimed is:

1. An image processing apparatus comprising:
   a) input means for inputting an image signal;
   b) clamp means for clamping said image signal to a predetermined reference voltage;
   c) detecting means for detecting an optical black level of said clamped image signal;
   d) operating means for comparing said optical black level detected by said detecting means and a predetermined black level, thereby calculating a correction amount; and
   e) correcting means for correcting the optical black level by feeding forward the correction amount obtained by said operating means for said clamped image signal.

2. An apparatus according to claim 1, further having A/D converting means for converting an output of said clamp means to a digital image signal.

3. An apparatus according to claim 2, wherein an output of said A/D converting means is supplied to said detecting means.

4. An apparatus according to claim 2, further having digital image signal processing means for performing a predetermined process to said digital image signal.

5. An apparatus according to claim 1, further having reference voltage generating means for generating said predetermined reference voltage and supplying to said clamp means.

6. An image pickup apparatus comprising:
   a) photoelectric converting means for photoelectrically converting an image pickup light of an object and outputting an image signal;
   b) clamp means for clamping said image signal to a predetermined reference voltage;
   c) reference voltage generating means for generating said predetermined reference voltage;
   d) detecting means for detecting an optical black level of said clamped image signal;
   e) operating means for comparing said optical black level detected by said detecting means and a predetermined black level, thereby calculating a correction amount; and
   f) correcting means for correcting the optical black level by feeding forward the correction amount obtained by said operating means for said clamped image signal.

7. An apparatus according claim 6, further having A/D converting means for converting said image signal clamped by said clamp means to a digital image signal.

8. An apparatus according to claim 7, further having digital image signal processing means for performing a predetermined process to said digital image signal.

9. An apparatus according to claim 6, wherein said photoelectric converting means includes a CCD.

10. An apparatus according to claim 6, wherein said detecting means detects a luminance level.

11. An image pickup apparatus comprising:
    a) an image pickup device for converting an image pickup light of an object to an image signal;
    b) an AGC circuit for adjusting a gain of said image signal converted by said image pickup device;
    c) a clamp circuit for clamping said image signal to a predetermined reference voltage;
    d) a reference voltage generation circuit for generating said predetermined reference voltage;
    e) an A/D conversion circuit for converting the image signal clamped by said clamp circuit to a digital image signal;
    f) a detection circuit for detecting an optical black level of said digital image signal;
    g) an operation circuit for comparing said optical black level detected by said detection circuit and a predetermined black level, thereby calculating a correction amount; and
    h) a correction circuit for correcting the optical black level by feeding forward the correction amount obtained by said operation circuit for said clamped image signal.

12. An apparatus according to claim 11, wherein said image pickup device includes a CCD.

13. An apparatus according to claim 11, wherein said detection circuit detects a luminance level.

14. An apparatus according to claim 11, wherein said detection circuit is an integration circuit.

15. An apparatus according to claim 11, wherein said correction circuit is an addition circuit.

16. An apparatus according to claim 11, wherein said detection circuit, said operation circuit, and said correction circuit are constructed as an IC.

17. An apparatus according to claim 11, further having a digital image processing circuit for performing a predetermined process to said digital image signal.

18. An apparatus according to claim 17, wherein said detection circuit, said operation circuit, said correction circuit, and said digital image signal processing circuit are constructed as an IC.

* * * * *